United States Patent Office
2,962,323
Patented Nov. 29, 1960

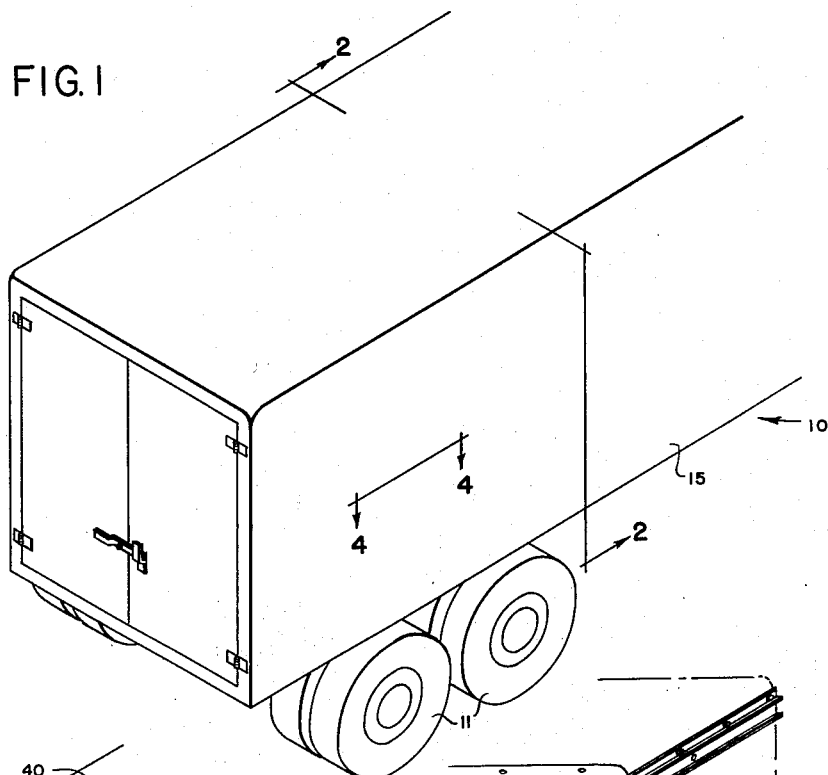
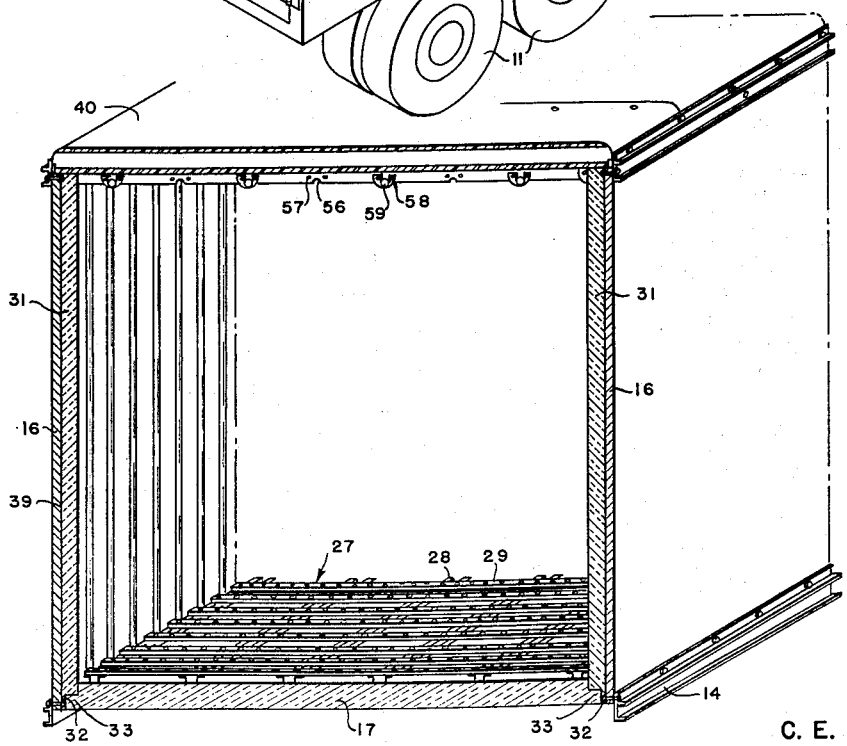

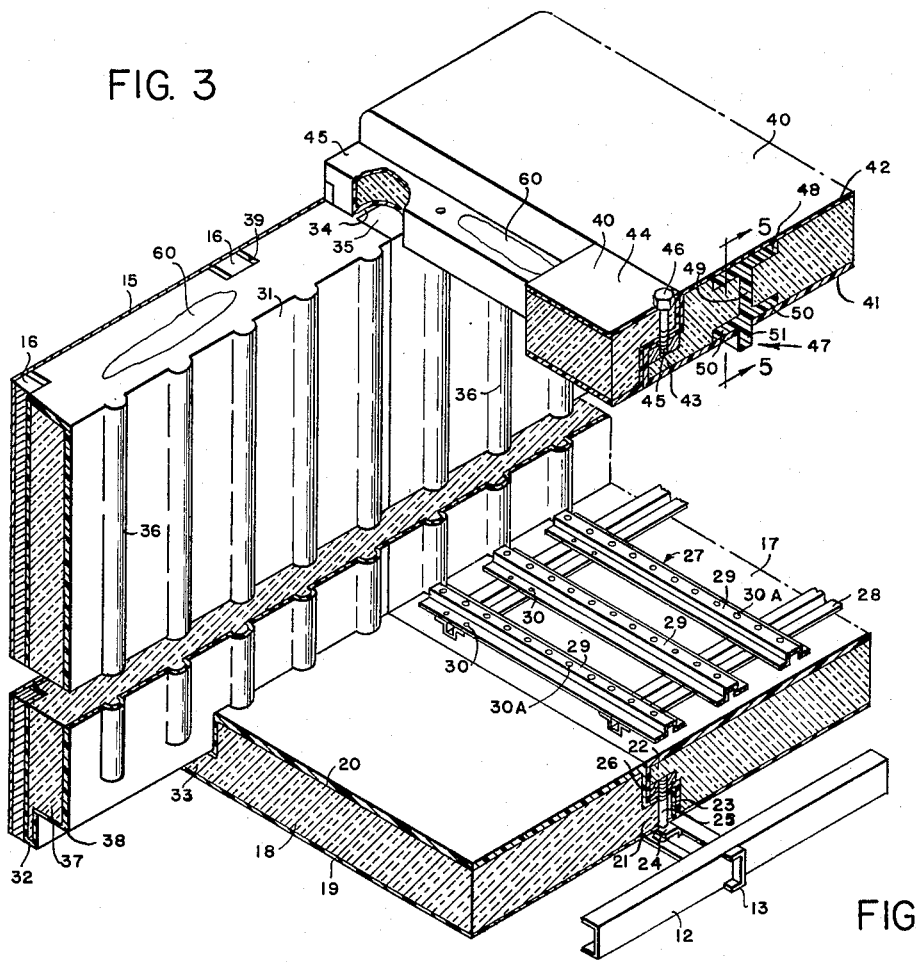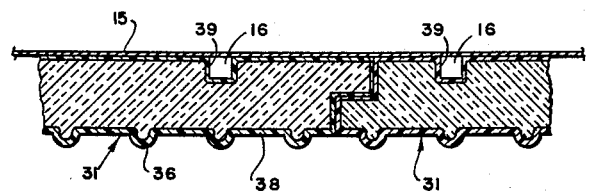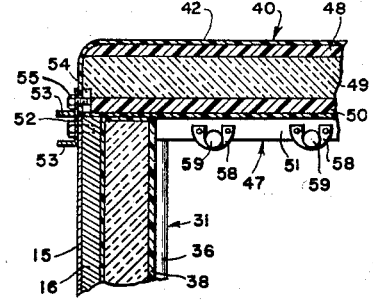
INVENTOR
C. E. McBRIDE

2,962,323

HEAT INSULATING ENCLOSURE

Clarence E. McBride, Box 2169, Birmingham, Ala.

Filed Jan. 4, 1956, Ser. No. 557,325

6 Claims. (Cl. 296—28)

The present invention relates to temperature control and more particularly to insulating structure to prevent the passage of heat and moisture from the outside to the interior of a hollow body or structure, and more particularly to vehicle construction in which the vehicle body contains one or more compartments insulated to prevent the passage of heat and moisture through the walls of such body.

It is frequently necessary to replace the insulating material in truck bodies, railroad cars and refrigerators because of the penetration of moisture into the insulation with resulting reduction in the insulating qualities and deterioration of such insulation material. Although much research has been done in an effort to overcome these difficulties, there has been no completely satisfactory solution. Because of the low efficiency and the reduction in insulating qualities of the walls of refrigerated vehicles, for example, it has been necessary to use an excessively large refrigerating unit and an excessive amount of power and resultant weight for operating the same resulting in excessive non-paying load on the truck or trailer with resulting loss in revenue because of "dead weight." The great weight of previously known insulating structures has also reduced the useful load of the truck or trailer.

Among the characteristics desired in the insulation of vehicles are that the insulation be lightweight, easily applied, and capable of withstanding continuous movement, mechanical shock and the like without deteriorating or lowering in efficiency. It is also necessary that the heat conductivity be low so that space requirements for the insulation may be kept as low as possible and that it be substantially impervious to vapor transfer and absorption.

Problems such as ease of application and the prevention of the absorption or the transmission of moisture have been undertaken in warehouse insulation and the like by the use of wall sections with insulating materials embodied therein including metallic and other barriers to the transmission of moisture. These have been used to a certain extent in vehicle insulation but have not proven satisfactory because of the additional weight resulting from the structural elements necessary to provide strength and to provide the characteristics to prevent the transmission of moisture under prevailing conditions over a long period of time. In addition, there have been problems as a result of road shock and the inability to completely seal the insulation especially at the joints.

The condensation of moisture in the insulation of vehicles has been particularly troublesome, as it adds substantially to the dead weight and destroys insulation, resulting in loss of valuable cargo.

An object of the present invention is to overcome the defects of the prior art and to provide a heat retaining housing of low weight and high efficiency over its entire life.

Another object of the present invention is to provide panels of insulating material with completely enclosing moisture-proof covering material of sufficient strength, toughness and moisture resistance to form long-lasting housings of suitable sizes for use on vehicles such as railroad cars, highway vehicles and the like.

A further object of the present invention is to provide an insulated chamber structure of general utility which may be used for long periods of time without deterioration.

A further object of the present invention is to provide insulating panel structure with indentations or grooves in the exterior surface to accommodate structural members of a vehicle body or other housing whereby the inside dimensions of an insulated chamber formed by the panels are kept at a maximum without objectionable reduction in the effectiveness of the insulation.

A further object of the invention is to provide a method of forming an insulating panel permitting efficient and economical manufacture of such panels.

A further object is to provide insulating panel construction which may be readily applied to existing vehicles with a minimum of delay and an existing vehicle can be transformed to a refrigeration vehicle without complete rebuilding of the vehicle.

Another object of the present invention is the provision of an improved unitary panel which may be formed into a suitable shape in which it is especially applicable for vehicle insulation and which has the necessary qualities described above. Although especially designed for vehicle insulation, it is also adaptable for insulation of other enclosures such as refrigerators, warehouses and the like.

Briefly stated, the improved structural panel of the present invention is formed by encasing insulating material such as one of the relatively rigid materials in board form, including but not limited to plastic, glass or rubber foams, within a sealed shell formed of a fibrous glass or glass filament reinforced plastic such as a polyester resin binder. Rigid board insulating materials such as "Styrofoam," are well known and suitable for the insulation. Fibrous glass or glass filament materials are also well known in the art, and plastic binders likewise are well-known.

The Fiberglas reinforced plastic is made of a thickness and shape to provide the necessary strength, rigidity and other mechanical requirements serving as anchor supports and the like, and for attaching the panels to the vehicle body. The fibrous glass reinforced plastic has low conductivity and is relatively light in weight as well as providing a sealed unit which is substantially impervious to the absorption or transmission of moisture. It is also capable of withstanding road shock and of being appreciably flexed without fracture. The filler insulation is lightweight, moisture resistant, has very low thermal conductivity and is integrally formed within the shell.

Panels for the floor, walls and ceiling may be formed for vehicles of particular size and types and may be quickly installed. It is contemplated that the exterior surface of the panels will be conformed to mate or interengage with the interior surfaces of the vehicle in order to conserve space. The interior surface of the panels may be ribbed or the like in order to permit air circulation between the cargo and the panels. Similarly, the panels may have stepped end portions which may be keyed together at the joints.

When the panels are installed in a vehicle, it is contemplated that a plastic sealing composition will be applied at the joints therebetween which will bond and seal the panels together but which will be of the type not to harden to brittleness in order that the panels may be separated and removed when necessary. It is contemplated that panels made as described herein will outlast the life of the vehicles in which they are employed and that they may be removed therefrom for service in other vehicles.

Other and further objects will be apparent as the description proceeds and upon reference to the accompanying drawings wherein:

Fig. 1 is a perspective of the rear portion of a vehicle provided with an insulated chamber according to the present invention;

Fig. 2, a transverse section taken substantially on line 2—2 of Fig. 1 showing the roof structure including the cargo supporting beam extending across the vehicle and supported on the vertical posts of a trailer;

Fig. 3, a fragmentary perspective, looking from the front rearwardly, of a portion of the vehicle chassis and body with the insulating structure of the present invention applied thereto;

Fig. 4, a horizontal section taken substantially on line 4—4 of Fig. 1 showing the connection between adjacent side walls of the insulating chamber; and Fig. 5, a section taken substantially on line 5—5 of Fig. 3, showing how the roof structure is secured to the side wall strucure of the vehicle body.

Upon more detailed reference to the drawings, the rear portion of a vehicle such as a trailer or a truck 10 is shown as having wheels 11 supporting longitudinally extending stringers 12 and a plurality of cross members 13 on the outer end of which cross members a rub rail 14 is secured. A skin or covering 15 is supported in place by means of vertically extending posts 16 suitably supported from the cross members thereby providing a chassis structure with side walls and a skeleton floor supporting framework. Such vehicles may be purchased on the market with or without conventional flooring and the present invention is adapted to be applied to such vehicles.

Upon the longitudinal stringers 12 and cross members 13 a plurality of floor panels, 17, 17, are mounted, each floor panel comprising a body 18 formed of insulating material such as "Styrofoam" which is approximately 6" thick of a length to extend between adjacent cross members 13 and of a width to extend the width of the vehicle, and provided with a rabbet on its upper surface at the rear end of the panel and at both sides thereof, a similar rabbet being formed from the lower surface at the forward end. Such "Styrofoam" or similar insulating material is completely covered by a fiber glass covering formed from woven fiber glass cloth and impregnated with a suitable resin such as a polyester resin thereby providing a complete, strong, flexible and tough moisture-proof envelope. The lower covering 19 is preferably in the order of ¼" thickness of Fiberglas and resin and the upper covering 20 is preferably ½" thick. The panels 17 are designed of sufficient strength to serve as a support for cargo carried thereby and if necessary suitable reinforcing may be included to increase the structural strength thereof. It will be observed that the tongue 21 at the rear of one of the floor panels 17 and a mating tongue 22 at the front of the adjacent panel are so arranged that the abutting joint 23 between the tongue 21 and the rabbet in the rear end of the next adjacent floor panel 17 is located directly above a cross member 13 thereby assuring strong and level securement of the floor panels 17 on the vehicle. To prevent displacement and maintain the floor panels in position, a plurality of Z-shaped clips 24 are secured to the cross members 13 and bolts 25 pass through the clips 24 and through the tongue 21 and into a bar 26 embedded within the tongue 21 and suitably threaded to receive the threaded end of the bolt 25 whereby the floor panels will be secured in proper position and prevented from displacement. Resting upon the floor section 17 are cargo supporting racks 27 which are preferably formed of longitudinally extending inverted hat shaped strips 28 and a plurality of transversely extending hat shaped strips 29 arranged to form a lattice work and connected together by rivets 30. The transverse strips 29 are preferably located on 6" centers so that the racks will support 8" packages without contact with the floor sections 17 thereby avoiding obstructing the flow of air between the longitudinally extending strips 28. It will be noted that each of the hat shaped strips 28 and 29 is provided with apertures 30A to provide for additional circulation of air. These strips may be made of Fiberglas and polyester resin so as to be of sufficient strength and to be unaffected by moisture. A more detailed showing appears in Fig. 3. These racks 27 are of a size to be easily handled, one suitable size being 6'6" wide and 3' long.

A plurality of wall sections 31 are provided with rabbets on their inner surfaces at their bottom edges leaving a tongue 32 adapted to engage the adjacent tongue 33 formed by the rabbet at the side edge of the floor panels 17, the rabbet formed in the lower edge of each side panel 31 snugly receiving the tongue 33 of the adjacent floor panel. The side panels 31 are each provided with a rabbet formed in the lower edge of each side panel 31 snugly receiving the tongue 33 of the adjacent floor panel. The side panels 31 are each provided with a rabbet leaving a tongue 34 on one end and a rabbet leaving a tongue 35 for cooperation with adjacent rearwardly and forwardly located side panels thereby providing a lapped joint similar to that formed by tongues 21 and 22 in the floor panels, the height of each of the vertically extending posts 16, and such side panels 31 are provided with inwardly extending ribs 36 about ½" high which prevent the cargo from completely obstructing the circulation of air between the panels 31 and the cargo. It will be understood that the panels 31 are also formed from a board-like lightweight cellular insulating material 37, such as "Styrofoam" or the like, and that such insulating material is covered by a Fiberglas resin impregnated covering 38 thereby completely enclosing the insulating material and preventing moisture from coming within the envelope formed by the covering 38. To accommodate the vertically extending posts 16, the outer surfaces of the panels 31 are provided with grooves or recesses 39 which receive the adjacent posts 16 and, if desired, other grooves may be provided to receive other structural members whereby the effective inside dimension of the refrigerating chamber may be kept at a maximum without increasing the over-all width of the vehicle.

For completing the chamber structure, a plurality of roof panels 40 are provided to extend completely across the vehicle and over the upper edges of the opposed side panels 31, 31. Each roof panel includes a body of insulating material 41 of "Styrofoam" or the equivalent and a covering material 42 of fiber glass or the equivalent impregnated with a suitable resin such as polyester resin to provide a completely moisture-proof envelope in a manner similar to that previously described with respect to the floor panels 17 and side panels 31. A forwardly extending tongue 43 is provided at the forward edge of the roof panels 41 and a cooperating rearwardly extending tongue 44 is provided on the next adjacent rearwardly located roof panel 40, the tongue 43 being provided with a bar 45 with threaded apertures for receiving attaching bolts 46 similar to attaching bolts 25 of the floor sections, thereby providing a simple and convenient structure for maintaining a tight joint between the tongues 43 and 44.

Extending across the roof panel 40 are a plurality of beams 47, each beam being preferably formed of Fiberglas and a binder of polyester resin or equivalent material and including a top flange 48, a vertical web 49, intermediate opposed flanges 50, 50, and a pipe receiving and supporting web 51. It will be noted that the beams 47 are arranged to have the web 49 and opposed flanges 50, 50 rest upon the corresponding adjacent vertical posts 16, 16, as shown in Fig. 5. For retaining the roof sections 40 in position, a rub rail comprising a vertically extending web 52 and laterally extending flanges 53 is secured by bolts and/or rivets to the upper ends of the vertically extending posts 16 and the skin 15 with the web portion 52 projecting thereabove to overlap the exterior surface of the roof panels 40. The roof panels are provided with longitudinally extending bars 54, 54 on each side thereof and attaching bolts 55 pass through the web portion 52 of the rub rail and are threaded into the bars 54, thereby maintaining the roof panels in assembled relation and also maintaining the beams 47, 47 in proper position over the posts 16 thereby assuring adequate support.

The web portion 51 of the beams 47 is provided with a plurality of pipe receiving recesses 56 and adjacent attaching apertures 57 for receiving bolts or the like which pass through straps 58 which embrace pipes 59 and support such pipes so that meat or the like may be suspended from the roof of the insulated chamber. It will thus be seen that the load may be suspended from the roof or alternatively the load may be supported on the floor by means of the racks 27 whereby the circulation of air around the cargo is always assured.

Suitable sealing material 60 is provided in each rabbet at the edges of the panels in sufficient quantities to completely seal the rabbet and the cooperating tongue. Also, sealing material will be provided between the top edges of the sides and the abutting surface of the roof panels to assure a seal-tight joint. To maintain the adjacent panels together with sealing material 60 therebetween, bolts such as 25 or 46 are provided. The workmen assembling the panels drill holes through the adjacent tongue of one panel and through the metal bar 26 of the inner tongue of the adjacent panel. The holes in the bar 26 are tapped for receiving the bolts and the bolts are tightened to obtain the desired degree of tightness. It will be evident that the number of bolts used may be selected in accordance with the requirements. It will also be evident that the fiber glass material and plastic provide a structure of strength above that of steel for the weight of the structure and that the fiber glass material serves to increase the efficiency of the insulation.

Although the dimensions of the various parts may be varied depending upon the vehicle on which the structure is to be mounted, it has been found that a spacing of the grooves 39 of approximately 18" to provide for the vertical posts 16 is satisfactory and the length of the side panels of approximately 54" is suitable. The roof sections similarly may be 54" long and of the width of a vehicle, a roof of 96" in width being satisfactory. The floor panels are preferably of a length to locate the abutting edges of the transverse joints on the cross members 13 and the width of such floor panels being approximately 90".

It will be evident that the present construction is suitable for trucks, railroad cars, warehouses and the like. A particular advantage is that the insulating structure may be reused even though the surrounding housing or vehicle deteriorates beyond use.

With the present construction the transfer of heat with 100° difference in temperature is approximately 4790 B.t.u.'s per hour in a trailer 35' long. Therefore a relatively low power refrigerating unit may be used and a relatively great saving in cargo carrying space and cargo carrying capacity is obtained.

It will be obvious to those skilled in the art that various changes may be made in the invention without departing from the spirit and scope thereof and therefore the invention is not limited by that which is illustrated in the drawings and described in the specification, but only as indicated in the appended claims.

What is claimed is:

1. An insulated chamber structure comprising a floor panel of insulating material completely covered with a fiber glass covering impregnated with a polyester resin, said floor panel being provided with a rabbet at each side and one end adjacent its upper surface and a rabbet at its other end adjacent the bottom surface, said floor panel being covered with said fiber glass and polyester resin covering and the upper surface being of sufficient thickness and strength for supporting cargo and cargo manipulating trucks, a side panel on each side of said floor panel, each side panel being rabbeted on its inner surface adjacent said floor panel to interengage with the tongue and rabbet of said floor panel, the outer surface of each side panel being provided with grooves for receiving supports of a surrounding housing, a roof panel mounted on the upper edges of opposed side panels, each roof anel being formed of insulating material and completely covered by fiber glass and polyester resin, said roof panel being provided with beams lying completely within said roof panel and being spaced apart the distance between said grooves of said side panels whereby said beams rest upon upright supports of said housing, means to support a load within the insulated chamber from said beams whereby such load is transmitted directly to the housing.

2. The invention according to claim 1, in which each side panel is provided with ribs on its inside surface preventing the cargo from interfering with passage of air between such side wall and the cargo.

3. The invention according to claim 2, in which spacing means are provided on the floor panel providing for circulation of air between cargo supported on said bottom panel.

4. The invention according to claim 1, in which some of the tongue portions adjacent said rabbets are provided with fastener retaining strips whereby fastening elements may pass through the tongue of one of said panels and into the fastener retaining strip of the tongue of an adjacent panel.

5. A side panel construction for an insulated chamber comprising a body of insulation material of substantial size and having grooves in its outer surface for receiving upright supports of a housing, a moisture impervious covering over said panel and extending into said grooves whereby the panel may be placed against the side of the housing thereby insulating the housing from the interior of the insulated chamber, some of said panels being provided with a rabbet on the inner surface and the other end of the panel being provided with a rabbet on the outer surface, the inner tongue portion of one of said rabbets being provided with a strip extending substantially the length of the rabbet within the outer covering for receiving fastening means terminating within said tongue from an adjacent panel for securing such adjacent panel to said first mentioned panel thereby providing a unitary structure.

6. An insulating structure for supporting a load from the top wall thereof comprising a panel having a fiber glass sheet on the inner surface thereof, a rigid insulating material above the fiber glass sheet and a water proof covering sheet material on the exterior of the insulation, the end edges of each panel being closed with fiber glass sheet material, a load carrying beam substantially the length of the top panel, said load carrying beam including a flange adjacent the outer covering sheet and a flange adjacent the inner fiber glass sheet with a vertical web of fiber glass material extending between the flanges and means to secure a load in suspended relation from the beam whereby the conduction of heat will be kept to a minimum between the inner flange and the outer flange of said beam.

References Cited in the file of this patent

UNITED STATES PATENTS

| | | |
|---|---|---|
| 1,486,113 | Baxter et al. | Mar. 4, 1924 |
| 2,279,545 | Zane | Apr. 14, 1942 |
| 2,323,936 | Roberts | July 13, 1943 |
| 2,578,052 | Evanoff et al. | Dec. 11, 1951 |

(Other references on following page)

UNITED STATES PATENTS

| | | | |
|---|---|---|---|
| 2,629,140 | Clements | Feb. 24, | 1953 |
| 2,642,818 | Talmey | June 23, | 1953 |
| 2,657,088 | Clement | Oct. 27, | 1953 |
| 2,730,772 | Jones | Jan. 17, | 1956 |
| 2,731,682 | Evans | Jan. 24, | 1956 |
| 2,744,042 | Pace | May 1, | 1956 |

FOREIGN PATENTS

| | | | |
|---|---|---|---|
| 710,468 | Germany | Sept. 13, | 1941 |
| 686,163 | Great Britain | Jan. 31, | 1953 |

OTHER REFERENCES

"How To Design Reefers Better" in "Commercial Car Journal," May 1954; pages 84, 85, 102 and 104.

"Plastic Trailers," in "Automotive Industries," Jan. 1, 1954, pages 64, 65 and 122. Copy in "Fleet Built Plastic Bodies" in "Commercial Car Journal," Feb. 1954, pages 82, 83, 130 and 131.